Feb. 15, 1944. H. L. REED 2,341,573
METHOD OF SEALING EARTH FORMATIONS
Filed Aug. 10, 1937 3 Sheets-Sheet 3

Inventor
Howard L. Reed.
J. Vincent Martin
and
Ralph R. Browning.
By Attorneys

Patented Feb. 15, 1944

2,341,573

UNITED STATES PATENT OFFICE 2,341,573

METHOD OF SEALING EARTH FORMATIONS

Howard L. Reed, Houston, Tex., assignor of eleven and one-third per cent to Fohs Oil Company Application August 10, 1937, Serial No. 158,286

3 Claims. (Cl. 255—1.8)

This invention relates to a method of and means for sealing a well against the influx of undesirable liquids, gases or the like. More particularly, it relates to the sealing and strengthening of the walls of a well at points above, or below, the producing horizon and to the cementing in place of the customary well casing or similar apparatus.

This application is a continuation in part of my co-pending patent application Serial 114,098, filed December 4, 1936, for a Method of and an apparatus for drilling wells.

In the course of drilling a well, it is in most instances true that numerous producing strata are encountered before the stratum is reached from which it is desired to produce a liquid or other substance. It, therefore, becomes necessary, before the desired liquid is produced from the well, to seal the well against the influx of liquids and other substances from strata above or below the desired producing strata.

One of the most conventional means for sealing the walls of a well has in the past consisted of lowering into the well a pipe of relatively large diameter known as a casing, this pipe extending to a position just above the level of the desired producing stratum. The lower end of the casing is then sealed to the walls of the hole by pumping into the well and injecting into the space between the lower end of the casing and the walls of the well a cementitious material such as the customarily used hydraulic cement. This hydraulic cement is usually forced in to place by pumping it downwardly through the casing and permitting it to rise about the casing between the outer wall of the casing and the walls of the hole. It is desirable that this cement form a perfect seal both with respect to the casing and with respect to the walls of the hole in order that the liquids and other substances which might be produced from the formation above or below the desired producing formations, may not be allowed to enter the well and mix with the substances to be produced from the well.

It is the object of this invention to provide a means and method of strengthening the walls of the hole to prevent the caving of the formations, and at the same time, form a positive formation seal which may, however, be readily removed.

It is the further object of this invention to provide a method of and means for cementing or sealing the lower end of a casing to the walls of a well in which a more perfect seal may be obtained, both between the sealing material and the casing and between the sealing material and the walls of the well.

It is the further object to provide a means of and method to cement a casing in place which will not only form a seal between the casing and the walls of the hole, but will also penetrate the formation adjacent the lower end of the casing and form a seal within the formation itself, so as to prevent seepage from above the seal through the formation and into the well below the seal.

Another object of this invention is to provide a removable casing seal so that the casing after being cemented can be readily removed.

One other object of this invention is to provide a novel method of solidifying an earth formation.

Other objects and advantages of this invention will become apparent from the following description taken in connection with the accompanying drawings, it being understood that the said description and drawings are by way of illustration only and not by way of limitation. This invention is to be limited in its scope only by the prior art and by the terms of the appended claims.

While the following description is based upon the method of drilling as set forth in my above mentioned co-pending application, it is to be understood that the well may be drilled by other and more conventional methods.

Figure 1:
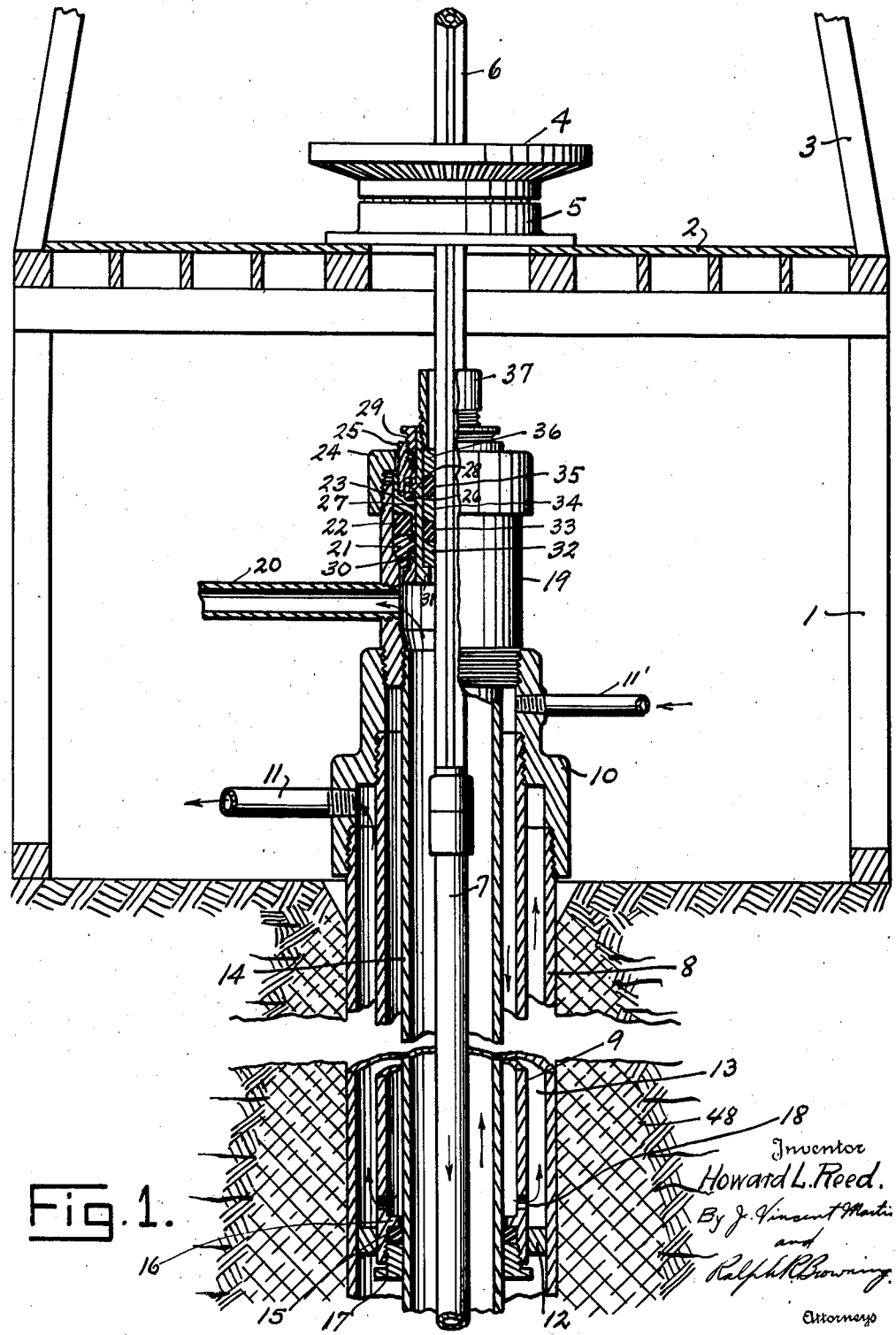
Fig. 1 is a view partly in vertical cross section illustrating the upper part of a well as the same is being drilled, the apparatus in this instance being set up and arranged to permit of drilling the well in accordance with the method described and claimed in my co-pending application above identified.
Figure 2:
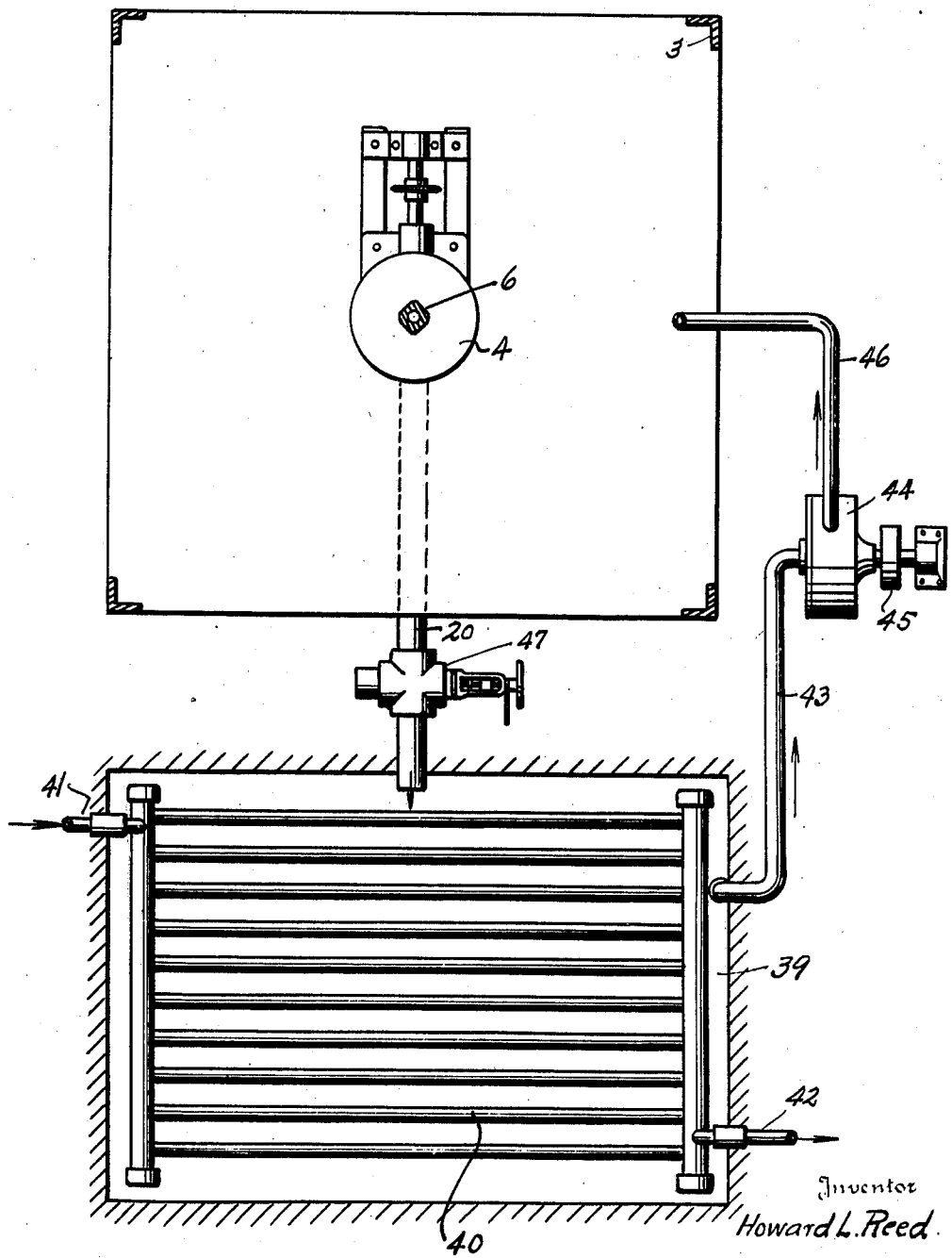
Fig. 2 is a diagrammatical top plan view illustrating the equipment utilized at the surface of the ground during the drilling of a well in accordance with said method.

Referring first to Fig. 1, the numeral 1 indicates the supports for the derrick floor 2 and for the derrick legs 3, which parts are of substantially the same construction as in ordinary practice. Likewise, the numeral 4 illustrates the table of a rotary machine and the numeral 5 the base of such machine, which is utilized for rotating the drill stem during the drilling operation. The numeral 6 designates the upper section of the drill stem ordinarily known as the Kelly joint, the same being of non-circular cross section and adapted to be rotated by the rotary machine just referred to. To the lower end of this Kelly joint 6 is secured the upper end 7 of the drill stem proper upon the lower end of which is mounted the drill used in drilling the well.

After the bore hole has been started and has progressed for a relatively short distance, there is positioned within the upper end of the same what is known as a surface string of pipe 8 which is of substantially the same outer diameter as the inner diameter of the bore hole. At the upper end of the surface string 8 there is provided a second string of pipe 9 of such a size as to leave an annular space outside of the string 9 and within the surface pipe 8. At their upper ends, both the strings 8 and 9 are externally threaded to receive a fitting 10 having an opening at one side thereof to which a flow line 11 may be connected in communication with the annular space between the surface string 8 and the pipe 9, and having also an opening adapted to receive a flow line 11' communicating with the interior of the pipe 9. It will be seen that the pipe 9 is of shorter length than the surface pipe 8, and a seal 12 is preferably formed between these pipes at the lower end of the pipe 9 thus closing the lower end of the annular space 13 formed between these pipes.

Within the pipe 9 there is lowered into the well a casing 14 which may be of conventional construction, and a seal 15 is provided between the lower end of the pipe 9 and the outer wall of the casing. This seal 15 is in the form of an annular packing which bears against an inwardly extending flange 16 on the pipe 9, and is compressed by means of a gland nut 17 threaded into the lower end of the pipe 9. It is to be noted that the pipe 9 just above the seals 12 and 15 is formed with a plurality of openings 18 therethrough.

At the upper end of the casing, the same is externally threaded into the lower end of a flow head 19, this flow head 19 being threaded into the interior of the upper end of the fitting 10 so as to form a closed annular space between the pipe 9 and the casing 14. The flow head 19 is provided with a lateral outlet 20, and at its upper end is mounted a stuffing box of a type adapted to receive the externally square Kelly joint 6.

The stuffing box just referred to consists essentially of a stationary ring 21 mounted within the upper end of the flow head, a packing 22 seated thereagainst, and a ring 23 adapted to bear against the upper end of the packing and cause it to form a seal with the inner wall of the flow head. A nut 24 serves to force the ring 23 downwardly against the packing 22. Threaded into the upper end of the ring 23 is a bearing race 25 adapted to receive anti-friction bearings 26 which in turn rotatably support a sleeve 27 having external bearing races 28 thereon. In order to prevent leakage past this sleeve and bearing, a pair of stuffing boxes 29 and 30 are provided at the upper and lower ends of this sleeve, respectively. The lower end of the sleeve 27 is provided with an inwardly extending flange 31 adapted to support a ring 32 which is preferably of square internal cross section. Supported upon this ring 32 is a packing 33, a ring 34, a packing 35, and a ring 36. The packings 33 and 35 are compressed between the respective rings by means of a nut 37 threaded into the upper end of the sleeve 27.

At the lower end of the drill stem 7 there is connected a drill which in this instance is illustrated as an expansible bit 38. During the drilling operation there is circulated through the well a fluid which is preferably a relatively pure molten sulphur. This sulphur is first heated within a pit 39 at the surface of the ground by means of steam coils 40 supplied with steam through a pipe 31. These steam coils have a discharge pipe 42 through which the condensate from the steam is conducted back to the boiler. As the sulphur in the pit 39 is brought up to the desired heat, it is drawn from this pit through a pipe 43 by means of a pump 44 which is illustrated by the centrifugal variety. It is to be noted that upon being melted, sulphur becomes very fluid, the viscosity being very low indeed, so that the material will flow substantially the same as water. This pump 44 may be driven in any suitable manner as by means of some power force through the pulley 45 and the discharge from this pump is conducted through a pipe 46 and through the customary hose connection to the interior of the Kelly joint 6. Thus it is forced downwardly into the well through the drill stem and allowed to arise to the top of the well again through the space surrounding the drill stem within the casing. After the well has been drilled to a sufficient depth to permit the insertion of the surface string 8 and the pipe 9, the same are put in place together with the stuffing box thereon, and the sulphur returning from the bottom of the bore hole may be heated to facilitate its flow within the well by forcing steam into the space between the pipe 9 and the casing 14, and causing the same to circulate downwardly around the outside of the casing and upwardly through the annular space 13, the exhaust passing out through the pipe 11.

It is to be noted that sulphur has a considerable density so that the hydraulic head thereof at any given depth would be substantially greater than the hydraulic head provided by the muds ordinarily used for circulation during the drilling of a well. Thus, the well could be kept under control and fluid and gas from the formation could be prevented from entering the well even more effectively with molten sulphur than with ordinary drilling fluids. However, in order to impregnate the walls of the formation on all sides of the bore hole with molten sulphur, it is desirable at times to increase the pressure upon the sulphur to force it into the formation. When this is desired, the flow bean 47 is interposed in the sulphur discharge line 20 and is utilized to throttle down the flow of sulphur from the well, thus building up pressure within the well.

Figure 3:
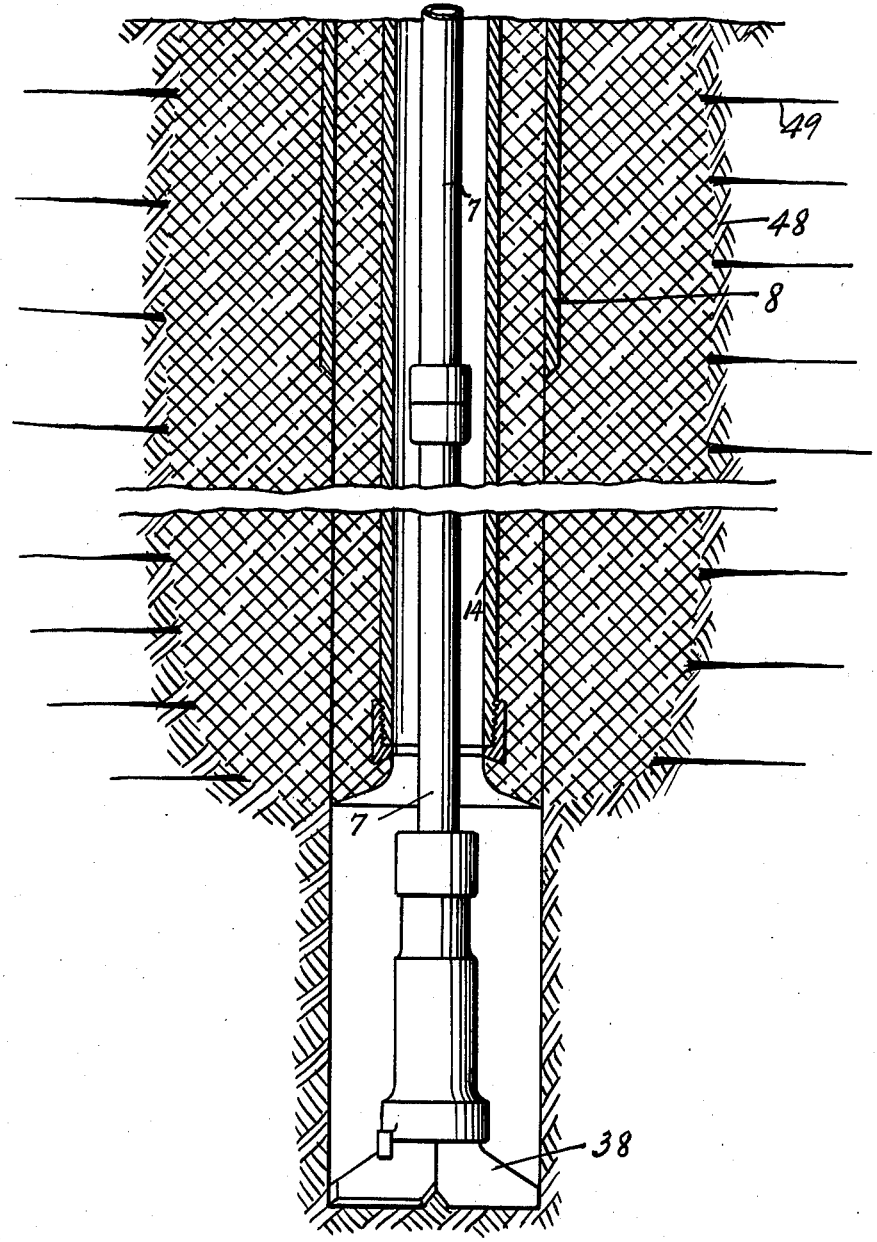
Fig. 3 is a vertical cross section illustrating the lower portion of such a well and the manner of sealing the casing in place therein in accordance with this invention.

As the well is being drilled, sulphur will, in view of the foregoing be forced into the formation to some extent such as indicated for instance by the numeral 48 in Figs. 1 and 3. It will also pass beyond this line wherever crevices or openings occur as indicated at 49. In view of the relatively high melting point of sulphur, the same will on passing into the formation be cooled below its melting point and caused to solidify. This, it will readily be seen, will, so to speak, solidify the formation itself, and where this formation consists of what is ordinarily known as heaving shale, the same will be positively prevented from caving in. Also, it will be protected from contact with water or water-bearing substances which might later otherwise come in contact therewith and which would cause the socalled heaving shale to swell, cave in, and probably ruin the well.

In addition to the foregoing, it will be seen that as the drilling proceeds below the lower end of the surface string 8, the molten sulphur will tend to solidify upon and around this surface string, thus firmly anchoring it in place. Likewise, after the drilling has proceeded to the upper surface of a producing formation, and it is desired to anchor the casing and drill into the producing formation, this may be accomplished by simply permitting the sulphur surrounding the casing to harden. It will readily be seen that this will not only anchor the casing and form a positive seal between the casing and the formation, but that it will also form a seal within the formation itself and render it impervious to water and other fluids.

With further regard to the anchoring of the casing by means of permitting the sulphur to solidify, it may be explained that this can be accomplished in any one of a number of different ways.

For instance, as soon as the oil sand is penetrated, the bit may be withdrawn and the sulphur forced from the interior of the casing by placing a plug in the upper end of the casing and pumping it downward with heated oil or mud. Sufficient time is then allowed to permit the sulphur around the casing to solidify and the drilling of the well may then proceed in the customary manner. That is to say, an expansible bit will be lowered through the casing and the drilling into the producing formation will be continued, using either oil or the customary drilling mud as a circulating medium. If oil is to be used, there must of course be some means of controlling the well and maintaining a pressure upon this oil in order that a blow-out will not occur. After the well drilling has been completed, the well may be tested and operated in the ordinary manner.

Another method would be to continue the drilling after positioning the casing at the point desired, and to pump into the drill stem a superheated mud, permitting this mud to wash downwardly through the drill stem and up through the casing until all the sulphur has been displaced from the casing. The temperature of the mud may then be reduced and the sulphur surrounding the casing permitted to freeze and anchor the casing in place.

If after the casing has been set it becomes desirable to move the casing either upwardly or downwardly, it will be seen that this can be readily accomplished by simply circulating a mud or similar substance through the casing until it is heated up sufficiently to permit it to move through the sulphur which surrounds it. This makes it possible to make a production test at one or more points in the well, and to make these production tests of any duration desired, in order to determine how the well will behave after it has been in production a short time. It is also noted that this feature enables the eventual recovery of the uncorroded casing after the well has ceased to produce, thus involving a considerable saving in the cost of the casing. During the production of the well it may also be adjusted to any position which may seem desirable in accordance with the changing characteristics of the well. The sulphur may also be melted to permit movement of a casing or drill pipe by applying a low voltage, high frequency alternating electric potential between the pipe and surrounding formation.

It is within the scope of this invention to cause the removal from the well of the surplus molten cementing fluid after the penetration of the formation has taken place by the use of so-called gas lift devices whereby the fluid is forced from the well by compressed gas or compressed air. This would leave the well free of the molten drilling or cementing fluid with the formation still impregnated with said fluid in solidified form. The formation would, therefore, be sealed but the hole would be substantially free of the molten fluid so that the completion of the well might be readily accomplished. In this connection, any desired or suitable type of gas lift pumping method may be employed for the purpose of raising the fluid. It is to be understood that while the method of anchoring the casing within a well is described as being carried on in connection with the drilling of a well by the method set forth, such anchoring of the casing is not limited to this method of drilling. For instance, it is within the spirit of this invention to drill a well in the ordinary manner using customary drilling fluids and after heating the well by the circulation of heated mud or other fluid, to anchor the casing therein by forcing a molten sulphur into the well in a manner similar to that now employed for forcing cement into the well, and thereafter permitting the well and sulphur to cool. By preheating the bore hole with a circulating drilling fluid the liquid sulphur is permitted to penetrate the walls of the hole. This penetration may be controlled by the extent of preheating, which guarantees a perfect formation seal by internal solidification. If a superheated mud drilling fluid or other aqueous medium is circulated in order to preheat the hole, the stuffing box described above will allow the use of a completely enclosed circulation system and thus prevent vaporization of the superheated preheating fluid.

If found necessary or desirable, the pumps and other parts of the apparatus used in placing the sulphur, may be preheated or kept heated to eliminate solidification of sulphur therein. After the casing has been thus anchored, it may, of course, be removed in the same manner above described or the drilling may proceed in the regular way.

In view of the foregoing, it will be noted that there has been provided a method of sealing the walls of a well and of solidifying an earth formation wherein the disadvantages inherent in previous methods have been eliminated and wherein all the objects and advantages sought by this invention may be realized.

Having described my invention, I claim:

1. The method of internally sealing and reinforcing the walls of a bore hole, which consists of preheating with a circulating drilling fluid, displacing the preheating medium with molten sulphur, permitting the molten sulphur to saturate the desired formations until the penetration freeezes therein, whereby the penetration of said sulphur into the formation surrounding the bore hole may be controlled by the temperature to which the bore hole is heated, prior to the injection of the molten sulphur.

2. In a method of securing a well casing in position within a well, the steps of placing in a well hole a liquid substance substantially solid at atmospheric temperatures, heating a casing, lowering said casing into said substance while continuing to heat the same, and discontinuing the heating of said casing to permit said substance to solidify about the casing and rigidly secure it in any desired position.

3. In a method of casing a well, the steps of placing in a well hole a liquid substance substantially solid at atmospheric temperature, heating a casing, lowering said casing into said substance while continuing to heat the same, discontinuing the heating of said casing to permit said substance to solidify about the casing and rigidly secure it in any desired position, and again heating said casing to liquefy said substance and free said casing when it is desired to move the same.

HOWARD L. REED.